(12) United States Patent
Alder et al.

(10) Patent No.: US 9,854,855 B2
(45) Date of Patent: Jan. 2, 2018

(54) SYSTEMS AND METHODS FOR INFLATING AN ARTICLE OF OUTDOOR GEAR OR APPAREL USING A DRY GAS

(71) Applicant: NuDown, Inc., Reno, NV (US)

(72) Inventors: Robert Nathan Alder, Provo, UT (US); Cory Tholl, Pleasant Grove, UT (US); Brady Woolford, Spanish Fork, UT (US)

(73) Assignee: NuDown, Inc., Reno, NV (US)

( * ) Notice: Subject to any disclaimer, the term of this patent is extended or adjusted under 35 U.S.C. 154(b) by 0 days.

(21) Appl. No.: 15/384,057

(22) Filed: Dec. 19, 2016

(65) Prior Publication Data

US 2017/0095012 A1    Apr. 6, 2017

Related U.S. Application Data

(63) Continuation of application No. 14/221,891, filed on Mar. 21, 2014, now Pat. No. 9,532,610, which is a continuation of application No. 13/226,246, filed on Sep. 6, 2011, now abandoned, which is a continuation of application No. 12/425,379, filed on Apr. 16, 2009, now abandoned.

(60) Provisional application No. 61/045,509, filed on Apr. 16, 2008, provisional application No. 61/103,242, filed on Oct. 6, 2008.

(51) Int. Cl.
| | | |
|---|---|---|
| B65B 1/04 | (2006.01) | |
| A41D 13/002 | (2006.01) | |
| B32B 27/00 | (2006.01) | |
| A41D 3/02 | (2006.01) | |
| A41D 31/00 | (2006.01) | |
| A41D 1/00 | (2006.01) | |
| A41D 1/04 | (2006.01) | |
| A41D 1/06 | (2006.01) | |
| A41D 27/04 | (2006.01) | |
| A63H 27/10 | (2006.01) | |

(52) U.S. Cl.
CPC .......... *A41D 13/002* (2013.01); *A41D 1/002* (2013.01); *A41D 1/04* (2013.01); *A41D 1/06* (2013.01); *A41D 3/02* (2013.01); *A41D 27/04* (2013.01); *A41D 31/0033* (2013.01); *B32B 27/00* (2013.01); *A41D 2400/14* (2013.01); *A63H 2027/1033* (2013.01); *Y10T 156/10* (2015.01)

(58) Field of Classification Search
CPC ............... B60S 5/04; B60S 5/00; B60S 5/043
See application file for complete search history.

(56) References Cited

U.S. PATENT DOCUMENTS

| | | | | |
|---|---|---|---|---|
| 4,453,271 A | * | 6/1984 | Donzis | A41D 13/0153 2/2.5 |
| 4,547,906 A | * | 10/1985 | Nishida | A41D 13/002 135/115 |
| 4,646,366 A | * | 3/1987 | Nishida | A41D 13/00 2/108 |
| 5,590,696 A | * | 1/1997 | Phillips | B60S 5/043 141/19 |

\* cited by examiner

*Primary Examiner* — Jason K Niesz
(74) *Attorney, Agent, or Firm* — Holland & Hart LLP

(57) ABSTRACT

An inflation system includes a bladder incorporated into an article of outdoor gear or apparel. The bladder is incorporated into the article of outdoor gear and apparel so as to provide insulation to a user. The inflation system includes a gas canister that includes a reservoir of dry gas. A valve mechanism allows the dry gas to be used to selectively inflate and deflate the bladder to provide a desired amount of insulation.

3 Claims, 12 Drawing Sheets

SYSTEMS AND METHODS FOR INFLATING AN ARTICLE OF OUTDOOR GEAR OR APPAREL USING A DRY GAS

CROSS-REFERENCE TO RELATED APPLICATIONS

This application is a continuation of U.S. Utility patent application Ser. No. 14/221,891, titled "Systems And Methods For Inflating An Article Of Outdoor Gear Or Apparel Using A Dry Gas," filed Mar. 21, 2014. This application is also a continuation of U.S. Utility patent application Ser. No. 13/226,246, titled "Systems And Methods For Inflating An Article Of Outdoor Gear Or Apparel Using A Dry Gas," filed Sep. 6, 2011. This application is also a continuation of U.S. Utility patent application Ser. No. 12/425,379, titled "Systems and Methods for Inflating An Article Of Outdoor Gear Or Apparel Using A Dry Gas," filed Apr. 16, 2009, which claims the benefit of U.S. Provisional Patent Application Ser. No. 61/045,509, titled "Thermal Insulating Comfort Control Jacket," filed Apr. 16, 2008, and U.S. Provisional Patent Application No. 61/103,242, entitled "System For Inflation of Gas Filled Insulation Material," filed Oct. 6, 2008. This application is also a continuation of U.S. Utility patent application Ser. No. 12/359,243, titled "Footwear Incorporating Gas-Filled Thermal Insulation," filed Jan. 23, 2009, which claims the benefit of U.S. Provisional Patent Application No. 61/062,183, titled "Gas Pressurized Boot With Thermal Insulating Capabilities," filed Jan. 23, 2008, U.S. Provisional Application Ser. No. 61/038,752, titled "Closed Cell Inert Gas Based Insulation", filed Mar. 22, 2008, U.S. Provisional Patent Application No. 61/103,246, entitled "Thin Insulative Material With Gas-Filled Cellular Structure," filed Oct. 7, 2008, and U.S. Provisional Patent Ser. No. 61/146,301 titled "System for Inflation of Gas-Filled Insulation Material, filed Jan. 21, 2009. This application is also a continuation of U.S. Utility patent application Ser. No. 12/013,326, titled "Thin Insulative Material With Gas-Filled Cellular Structure," filed Jan. 11, 2008, which claims the benefit of U.S. Provisional Patent Application Ser. No. 60/910,485, titled "ArgonShield: Comfort-Controlled, Ultrathin, Inert Gas Insulation Material," filed Apr. 6, 2007, all of which are hereby incorporated herein by reference in their entirety. It is to be understood, however, that in the event of any inconsistency between this specification and any information incorporated by reference in this specification, this specification shall govern.

BACKGROUND OF THE INVENTION

1. The Field of the Invention

The present invention is in the field of thermal insulation materials. More particularly, the present invention relates to portable gas reservoirs and valve mechanism for connecting and/or filling a gas filled thermal insulation material.

2. The Relevant Technology

Thermal insulators have long been important for human survival and comfort in cold climates. The primary function of any thermal insulator is to reduce heat loss (i.e., heat transfer) from a heat source to a cold sink. There are three forms of heat transfer: convection, conduction, and radiation.

Heat loss through convective mixing of gases is caused by the tendency of a gas to form a rotational mixing pattern between a warmed (i.e., less dense) region and a cooler (i.e., more dense) region. In a convection cycle, warmed gas is constantly being exchanged for cooler gas. One of the primary ways in which thermal insulators work is through suppressing convection by trapping or confining a volume of a gas within the insulative material. For example, one of the reasons that a fiber-filled parka feels warm is that the air near the wearer's skin is warmed by body heat and the fibers act to prevent or at least slow convective mixing of the warmed layer of the air with the cold air outside.

Conduction involves heat flow through a material from hot to cold in the form of direct interaction of atoms and molecules. For example, the phenomenon of conduction is one of the reasons why a thin layer of insulation does not insulate as well as a thicker layer.

Radiation involves direct net energy transfer between surfaces at different temperatures in the form of infrared radiation. Radiation is suppressed by using materials that reflect infrared radiation. For example, the glass surface of a vacuum flask is coated with silver to reflect radiation and prevent heat loss through the vacuum region.

Different thermal insulators prevent heat loss through convection, conduction, and radiation in different ways. For example, fiber-based thermal insulators like polyester fiber fill or fiberglass insulation utilize fairly low conductivity fibers in a stack or batt with a volume of air trapped or confined amongst the fibers. Furthermore, conduction is reduced by the random orientation of the fibers across the stack or batt, and radiative heat loss is somewhat reduced because the radiation is scattered as it passes through the fibers.

Another example class of thermal insulators includes closed cell structures, such as foams or microspheres. Closed cell structures are generally comprised of a polymer matrix with many small, mostly closed cavities. As with fiber-based insulations, these insulators conserve heat by trapping a volume of air in and amongst the cells. In fact, convection is effectively eliminated inside the small, closed cells. Furthermore, conduction is reduced by using low conductivity materials, and radiation is low because the cells are typically very small and there is little temperature difference between cavity walls and hence low driving force for radiative heat transfer.

Essentially all thermal insulators present a tradeoff between insulative value (i.e., prevention of convection, conduction, and radiation), bulk, and cost. For example, because of the bulkiness of fiber- or foam-based insulation, achieving a sufficient degree of insulation for a given set of conditions can be difficult without also making the article too bulky for practical use. It should also be appreciated that adding additional fiber- or foam-based insulation inevitably adds weight. Such insulative materials are also static in that the amount of insulative material cannot be changed or adjusted as the user's needs change. For example, if a person is wearing a fiber filled parka or sleeping in a fiber filled sleeping bag, the amount of insulation cannot be increased or decreased as environmental or activity conditions change.

In addition, many typical insulative materials produce toxic and/or environmentally damaging byproducts in the process of manufacture. For example, the manufacturing process for many thermal insulators such as polyester fibers or foams produces CFCs and/or greenhouse gases. Many typical thermal insulators also continue to outgas toxic chemicals long after their manufacture. For example, fiberglass insulation is typically manufactured with formaldehyde compounds that continue to outgas long after the insulation is placed in a wall or other structure. And many typical insulators, such as fiberglass or polyester fiber fill, produce loose fibers that can be harmful if they are inhaled.

BRIEF SUMMARY OF THE INVENTION

The present invention is directed to an inflation system that includes an article of outdoor gear or apparel that has a gas inflatable bladder and a gas reservoir (i.e., a portable gas canister) that can be used to inflate the bladder with a desired amount of a dry gas. The insulative material includes a gas bladder that may be filled with an insulative gas, such as argon, krypton, xenon, carbon dioxide, sulfur hexafluoride, and combinations thereof. The gas bladder may have a cellular structure to reduce convection. The gas inflatable bladder is configured and positioned in the outdoor gear or apparel so as to provide insulation to a user in an outdoor environment when the bladder is at least partially inflated with a dry gas. The system also includes a pressurized reservoir of a dry gas. The pressurized reservoir is in fluid communication with the inflatable bladder such that the fluid reservoir can be selectively used to inflate the bladder. An actuateable valve is positioned between the pressurized reservoir and the gas inflatable bladder. The actuateable valve is configured to allow a user to selectively open and close the valve to selectively fill the bladder with a desired amount of dry gas from the pressurized reservoir.

The insulative material can be incorporated into outdoor gear and apparel to make the outdoor gear or apparel warm, while still maintaining a desired thinness and flexibility. In one embodiment, the volume of the insulative gas in the gas bladder can be adjustable such that the insulation provided by the outdoor gear or apparel can be selectable.

In one embodiment, a filling system can include the gas reservoir and the filling system includes a first connector that can be coupled to a second connector integrated into the article of outdoor gear or apparel. The first and second connectors can couple together through a friction fit, snap fit, and/or magnetic fit so as to provide an attractive force that hinders the separation of the filling system from the article of outdoor gear or apparel valve during inflation of the bladder.

In one embodiment, a method is disclosed for using a dry gas reservoir to inflate an article of outdoor gear or apparel. The method includes (i) providing an article of outdoor gear or apparel that includes a gas inflatable bladder configured and positioned in the outdoor gear or apparel so as to provide insulation to a user in an outdoor environment; (ii) providing a filling system having an inlet for receiving a pressurized dry gas and an actuateable valve; (iii) providing a gas reservoir including a dry gas, the gas reservoir having an outlet configured to couple to the inlet of the filling system; and (iv) connecting the gas reservoir to the filling system so as to create a seal therebetween and actuating the actuateable valve to at least partially fill the inflatable bladder with the dry gas.

Another embodiment disclosed herein includes a portable gas canister for inflating an article of outdoor gear or apparel with a dry gas. The gas canister has an elongate shape with a proximal end and a distal end. The distal end includes a neck with an opening. A thread pattern is positioned on a threaded portion of the neck of the canister. A smooth neck portion extends distally from the threaded portion. The smooth neck portion has a smaller diameter than the threaded portion. A dry gas is disposed within the portable canister under a pressure of at least about 1000 psi. A rupturable membrane covers the opening to the neck and provides a seal for the dry gas until the membrane is ruptured.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed to systems, methods, and devices for inflating a bladder of an article of outdoor gear or apparel with a dry gas. The insulative material can be incorporated into outdoor gear and apparel to make the outdoor gear or apparel warm, while still maintaining a desired thinness and flexibility. The insulative material takes advantage of the superior insulative properties of dry gases and preferably highly insulative gasses such as argon. In one embodiment, the volume of the insulative gas in the insulative material can be adjustable such that the insulation provided by the outdoor gear or apparel can be selectable. Because the insulative component is a gas, the insulation value of the article can be adjusted by increasing or decreasing the amount of gas, without appreciably affecting the weight of the article. The cellular structure can be used to insulate a variety of outdoor clothing and gear.

I. Design of an Insulative Gas Cell

Figure 1:
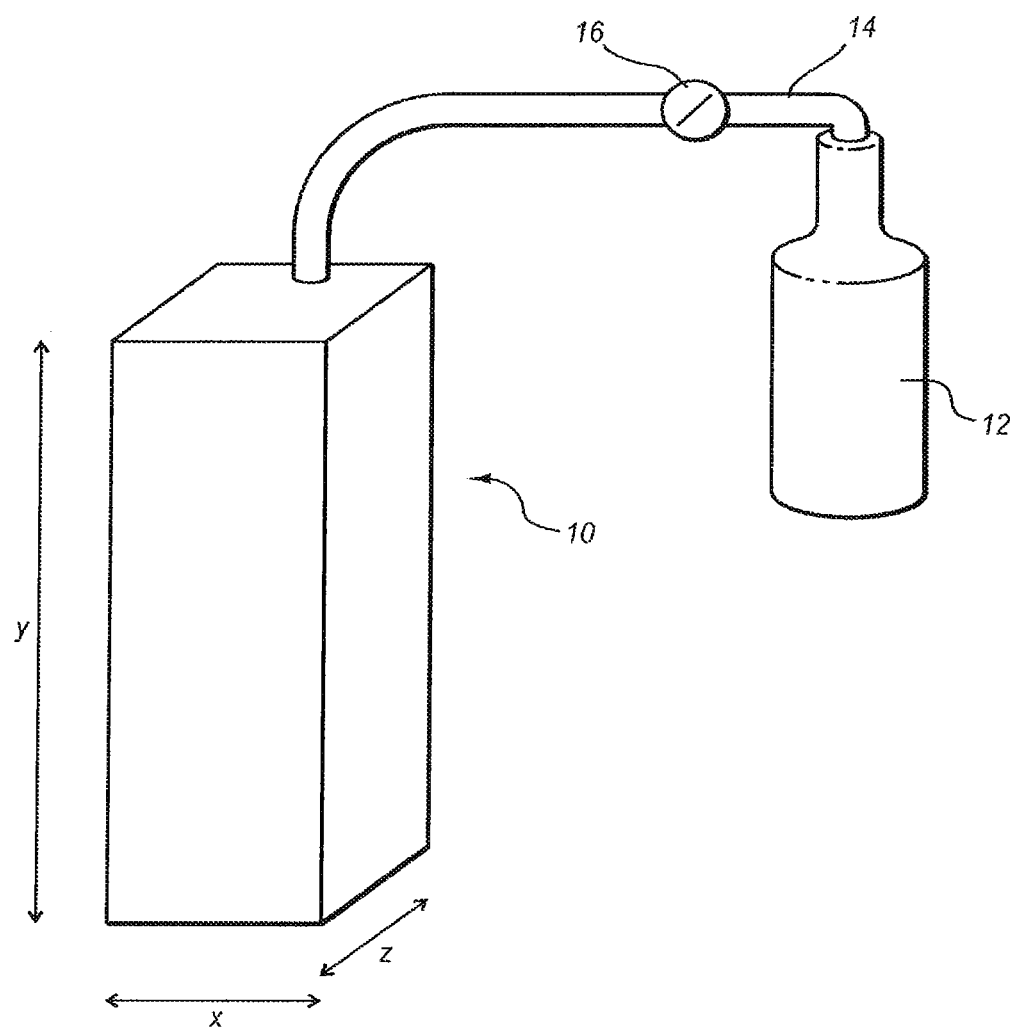
FIG. 1 illustrates a schematic of single insulating gas cell having X, Y, and Z dimensions, a gas reservoir, and a valve.

FIG. 1 illustrates a schematic of single insulating gas cell 10 having X, Y, and Z dimensions. In a lightweight, gas-filled, highly insulative article that depends on the insulating properties of dry gases, the selection of X, Y, and Z dimensions are selected to reduce heat transfer by means of convection.

Convective heat transfer consists of both forced and natural convection. Forced convection is due to the induced movement of the gas in the gas-filled cell. For example, in the case of a gas-filled cell that is incorporated into a garment, forced convection can be caused by movement of the wearer. Natural convection is a rotational flow pattern of gas caused by the temperature differential between warm and cool regions of the cell and gas buoyancy.

For example, in a gas filled insulating cell 10 like the one depicted in FIG. 1, the gas adjacent to the cell 10 surface nearest to a source of heat is typically at a higher temperature and lower density than the gas at the surface of the cell closest to atmospheric conditions. The hotter gas will rise and the cooler gas will replace the hotter gas thus setting off convective mixing of the gas within the cell 10. This will increase the heat transfer through the cell 10, which is undesirable for insulation. For both natural and forced convection, heat transfer is enhanced as the length of the free flowing path of the gas is increased. This is because convective mixing of the gas is allowed to more fully develop in these free flowing paths and thus heat transfer by convection is increased. This means that increasing the XYZ dimensions of the cell 10 depicted in FIG. 1 will tend to increase the tendency of convection coils to form inside the cell 10, which increases heat loss.

In one embodiment of the present invention, the cell 10 structure is specifically designed to reduce both free and forced convection of the gas inside the cell 10. Free and forced convection are minimized by choosing cell volume and dimensions that break up the free flow path of the gas inside the cell 10 and thus reduce convective mixing or rotational motion of the gas in the cell 10. In one embodiment of the present invention, a heat transfer model was developed that allows one to predict preferred cell dimensions (i.e., X, Y, and Z dimensions) in order to minimize natural convection and increase the insulating capabilities of the cell 10. These preferred cell dimensions for natural convection will also reduce heat transfer due to forced convection.

The model is developed by using both the Rayleigh value and the Nusselt number to predict the convective coefficient for the cell 10 under static conditions (i.e., natural convection and no forced convection). The Rayleigh value is a correlation between the buoyancy and viscous forces of the gas inside the cell 10. Large Rayleigh values are indicative of very buoyant flows leading to increased convection in the cell. Large Rayleigh values would be typical of convective mixing or rotational motion of the gas in large free flowing paths. The Rayleigh value can be expressed as the following for the geometry used for the cell structure.

$$Ra_L = \frac{gB(T_B - T_0)\delta^3}{v^2}Pr \qquad (1)$$

In equation 1, g represents gravity, B is the expansion coefficient for the gas, δ is the thickness of the cell structure when inflated with the gas, Pr is the Prandtl number, v is the kinematic viscosity of the gas, $T_B-T_0$ is the temperature difference between the inner and outer wall of the cell 10. For purposes of this invention, the Rayleigh value is calculated using a value of 37° C. for $T_B$ and −40° C. for $T_0$.

The Rayleigh value is used in turn to predict the Nusselt number, which quantifies convective heat transfer from the surfaces of the cell 10. The Nusselt number is then used to calculate the total heat transfer through the cell 10. Empirical correlations for the average Nusselt number for natural convection in enclosures were used to determine the Nusselt number based on the Rayleigh value and cell geometry. The Rayleigh value is significantly influenced by the thickness (i.e., the Z dimension depicted in FIG. 1) of the cell 10 and also the temperature difference between the inner and outer wall of the cell 10. Increasing the thickness will increases the free flowing path of the gas. When either the cell thickness or the temperature difference is increased than the Rayleigh value is increased which also causes the Nusselt number to increase. Equation 2 shows that as the Nusselt number is increased the total heat transfer in the cell is also increased.

$$Q = kNuA\frac{(T_B - T_0)}{\delta} \qquad (2)$$

Equation 2 also shows that the heat transfer through the cell 10 is also dependent on the facial area of the cell 10 (i.e., A=X·Y). As the facial area is increased, the heat transfer through the cell 10 is also increased. The equation for heat transfer also shows the importance of the thermal conductivity value, k of the gas used in the cell structure. The smaller the thermal conductivity of the gas the lower the total heat transfer through the cell structure. Thermal conductivity of the gas is a function of the gas type (i.e., some gases are better insulators than other gases), the moisture content of the gas (i.e., increased water content increases the thermal conductivity of the gas), and on the temperature.

One will appreciate from the above discussion that there is an interplay between heat loss through convection, as primarily influenced by cell thickness, and heat loss through conduction, as primarily influenced by the facial area of the cell, along with the thickness of the cell. In one embodiment, this interplay is balanced leading to a preferred range for dimensions of the cell 10. That is, as the cell 10 thickness is increased heat transfer through conduction is decreased. Nevertheless, there is a point of diminishing returns due to the fact that convective mixing or rotational motion increases as the cell 10 thickness is increased. Increased convective mixing and loss of insulation value is seen as an increase in the Rayleigh value for the cell 10. That is, as the thickness of the cell 10 is increased, there is a point where the increase in heat transfer due to convection is greater than the decrease in heat transfer due to conduction. After this point there is no longer a need to increase the thickness because no benefit in reducing heat transfer can be obtained.

Through use of this theoretical model, it was determined the preferred dimensions for minimal heat transfer through the cell 10 occur at a preferred Rayleigh value less than 300,000. More preferably, the Rayleigh value of the cell is in a range from about 50,000 to about 275,000. Most preferably, the Rayleigh value of the cell is in a range from about 125,000 to about 250,000. Rayleigh values greater than 300,000 will cause the insulative cell to perform less optimally due to convective heat transfer. This will reduce the effectiveness of the gas cell 10 as an insulator.

In one embodiment, the present invention includes a gas-filled, highly insulative cell 10. The cell 10 includes a first sheet of a gas impermeable material and a second sheet of a gas impermeable material joined together to form a cell 10. In one embodiment of the present invention, the cell 10 depicted in FIG. 1 is attached to a dry gas reservoir 12 and a valve mechanism 16 configured to allow the dry insulating gas to the introduced into and removed from the cell 10. Additionally, the cell 10, the gas reservoir 12, and the valve mechanism are connected to the cell 10 by means of a gas line 14. As was explained more fully in the preceding paragraphs, the volume and XYZ dimensions of the cell are chosen such that free and forced convective mixing of gas inside the cell is minimized.

In one embodiment, the cell 10 includes a dry insulative gas disposed within the cell 10. The identity of the insulating gas is an important factor in determining the insulative properties of the cell 10. In general, dry gases insulate better than moist gases, monatomic gases insulate better than diatomic or polyatomic gases, and heavy, viscous gases insulate better than lighter, less viscous gases. Preferably, the gas disposed within the cell 10 has a moisture content less than about 4 percent by weight. More preferably, the gas disposed within the cell 10 has a moisture content less than about 2 percent by weight. Most preferably, the gas disposed within the cell 10 has a moisture content less than about 1 percent by weight. The insulating gas can be selected from the group consisting of atmospheric air, argon, krypton, xenon, carbon dioxide, sulfur hexafluoride, and combinations thereof.

In one embodiment, the preferred Rayleigh value for the cell 10 is less than 300,000. More preferably, the Rayleigh value of the cell is in a range from about 50,000 to about 275,000. Most preferably, the Rayleigh value of the cell is in a range from about 125,000 to about 250,000. Based on a preferred Rayleigh value of less than 300,000, preferred X, Y, and Z dimensions for the cell 10 depicted in FIG. 1 were determined. Preferably, the cell volume is less than about 300 cm3 with XYZ dimensions of less than about 7 cm by about 14 cm by about 3 cm. More preferably, the cell volume is less than about 145 cm3 with XYZ dimensions of less than about 4 cm by about 12 cm by about 3 cm. Most preferably, the cell volume is less than about 100 cm3 with XYZ dimensions of less than about 4 cm by about 8 cm by about 3 cm. These dimensions minimize heat transfer due to both forced and natural convection.

II. Insulative Material Having Cellular Structure

Figure 2:
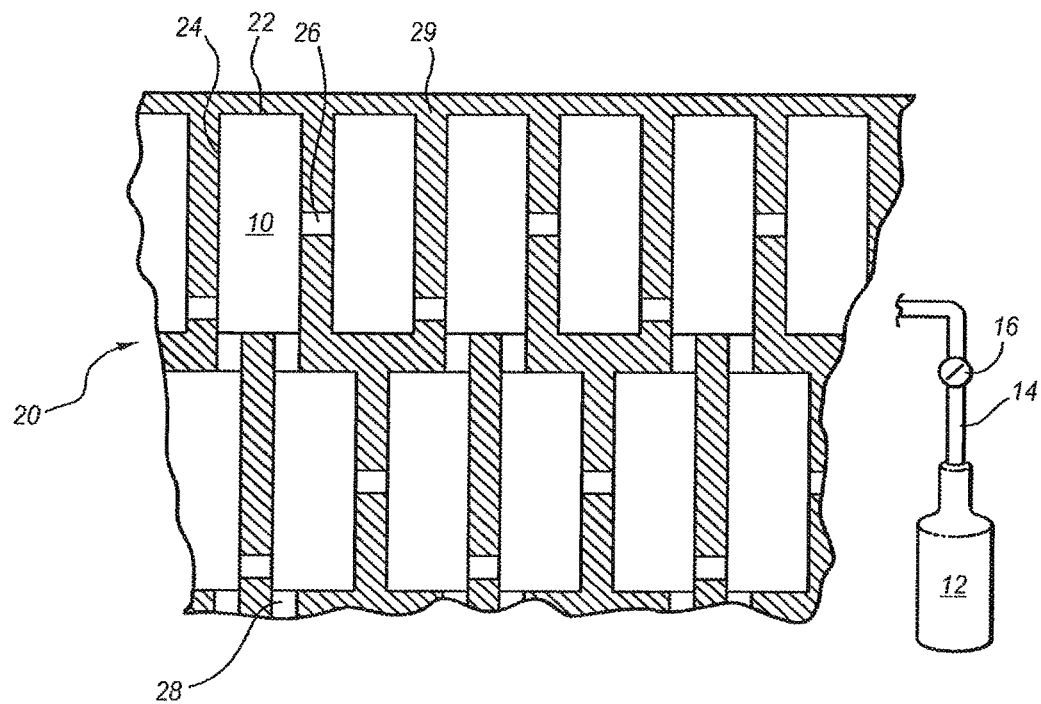
FIG. 2 illustrates an arrangement of a plurality of insulating gas cells as in FIG. 1 that are in fluid connection with one another and with a gas reservoir.

In one embodiment of the present invention, a plurality of insulative cells as depicted in FIG. 1 are grouped together to form an insulative cell structure. FIGS. 2¬5 depict various arrangements of the plurality of cells 10 that form a cell structure.

With reference to FIG. 2, the cell structure 20 comprises a first sheet of a gas impermeable material and a second sheet of a gas impermeable material that are joined together to form a chamber there between. The chamber is subdivided into a cellular structure comprising a plurality cells 10. The first and second sheets are bonded together such that there are open sections that form the cells 10. In between the cells, there are regions 29 where the first and second sheets are bonded together leaving essentially no open space between the first and second sheets.

In one embodiment, the cells 10 are in fluid communication with one another. In the cellular structure depicted in FIG. 2, the cells 10 are in fluid connection with one another via short connector tubes 26 and 28 that allow gas to flow between cells 10. It should be mentioned, however, that the connector tubes 26 and 28 do not enhance convection within the cells 10. That is, the connector tubes 26 and 28 are sufficiently small and they are placed such that convection currents do not form between adjacent cells 10.

In one embodiment, a dry insulating gas is disposed within the plurality of cells 10. The identity of the insulating gas is an important factor is determining the insulative properties of the insulative article 20. In general, dry gases insulate better than moist gases, monatomic gases insulate better than diatomic or polyatomic gases, and heavy, viscous gases insulate better than lighter, less viscous gases. Preferably, the gas disposed within the cells 10 has a moisture content less than about 4 percent by weight. More preferably, the gas disposed within the cells 10 has a moisture content less than about 2 percent by weight. Most preferably, the gas disposed within the cells 10 has a moisture content less than about 1 percent by weight. The insulating gas is selected from the group consisting of atmospheric air, argon, krypton, xenon, carbon dioxide, sulfur hexafluoride, and combinations thereof.

The insulative article 20 depicted in FIG. 2 is depicted as it may be attached to a dry gas reservoir 12 and a valve mechanism 16 configured to allow the dry insulating gas to be introduced into and removed from the cells 10 comprising the insulative article 20. The insulative article 20 is connected to the gas reservoir 12, and the valve mechanism 16 via a gas line 14. The connector tubes 26 and 28 depicted in FIG. 2 allow gas introduced into one cell 10 to fill all cells 10 in the insulative article 20.

As was explained more fully in the preceding section, the volume and X dimension 22, Y dimension 24, and Z dimension (not shown) of the cells 10 are chosen such that free and forced convective mixing of gas inside the cell is minimized. Minimizing free and forced convection of the gas inside the plurality of cells 10 increases the insulative efficiency of the insulative article 20. In one embodiment, the preferred Rayleigh value for the each of the plurality of cells 10 is less than about 300,000. More preferably, the Rayleigh value of the cell is in a range from about 50,000 to about 275,000. Most preferably, the Rayleigh value of the cell is in a range from about 125,000 to about 250,000. Based on a preferred Rayleigh value of less than about 300,000, preferred dimensions for each of the plurality of cells 10 depicted in FIG. 2 were determined. Preferably, the cell volume is less than about 300 cm3 with XYZ dimensions of about 7 cm by about 14 cm by about 3 cm. More preferably, the cell volume is less than about 145 cm3 with XYZ dimensions of about 4 cm by about 12 cm by about 3 cm. Most preferably, the cell volume is less than about 100 cm3 with XYZ dimensions of about 4 cm by about 8 cm by about 3 cm. These dimensions minimize heat transfer due to both forced and natural convection.

In one embodiment, the first and second sheets of material that form the plurality of cells 10 that comprise the insulative article 20 are comprised of a fabric, such as nylon, polyester, or spandex, bonded to a gas impermeable material. Examples of suitable gas impermeable materials include, but are not limited to, polyethylene, polypropylene, polyurethane, urethane, silicone rubber, latex rubber, polytetrafluoroethylene (PTFE), expanded PTFE, butyl rubber, and Mylar.

Figure 3:
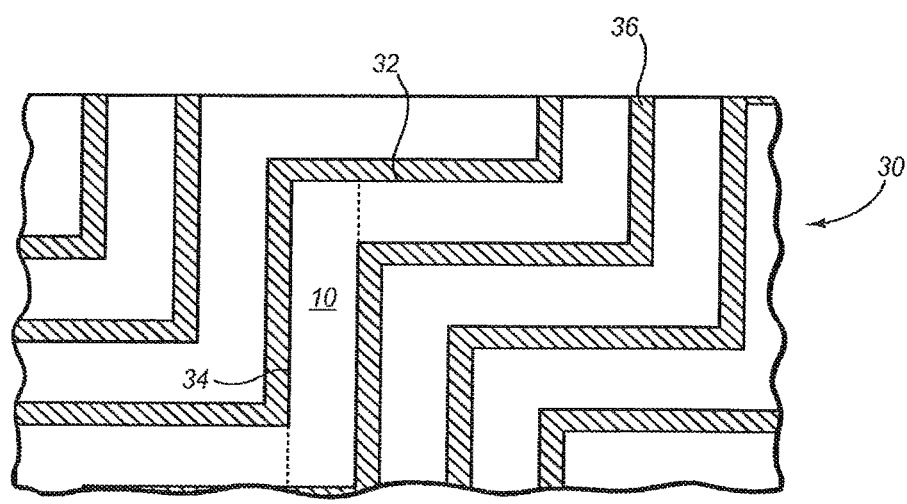
FIG. 3 illustrates an alternate arrangement of a plurality of insulating gas cells that are in fluid connection with one another.

FIG. 3 depicts an alternate arrangement of a plurality of cells 10 to form an insulative article 30. The cells 10 are formed as open space between two layers of gas impermeable material that are joined together to form a plurality of cells 10. Joined regions 36 are formed between the cells 10. In one embodiment, the cells 10 may be arranged in a zigzag fashion with adjacent cells 10 arranged at substantially right angles relative to one another. Each cell 10 has an X dimension 32, a Y dimension 34, and a Z dimension (not shown). The Y dimension 34 is depicted in part by an imaginary line that extends into the adjacent cell. The cell is bounded by the dotted lines because gas atoms traveling through the center of the cell have a free motion that is essentially bounded by these dimensions since most the gas atoms bouncing off the walls will stay within this space. For purposes of this invention, the plurality of cells can be partially open so long as the cells are at angles that limit direct flow. In one embodiment the opening in the cell has a surface that is less than about 20% of the surface area of the cell walls, more preferably less than about 10%, and most preferably less than about 5 percent.

As in the previous examples, the dimensions of each of the cells 10 are chosen such that heat loss through convection is reduced or minimized. Even though the cells are connected, the formation of convection currents that lead to heat loss are minimized because the right angles break up the free flow path of any convection currents that may form. That is, rotational convection currents generally cannot form around right angles.

Heat loss through convection is minimized if the Rayleigh value for the each of the plurality of cells 10 is preferably less than about 300,000. More preferably, the Rayleigh value of the cell is in a range from about 50,000 to about 275,000. Most preferably, the Rayleigh value of the cell is in a range from about 125,000 to about 250,000. Based on a preferred Rayleigh value of less than about 300,000, preferred dimensions for each of the plurality of cells 10 depicted in FIG. 3 were determined. Preferably, the cell volume is less than about 300 cm3 with XYZ dimensions of about 7 cm by about 14 cm by about 3 cm. More preferably, the cell volume is less than about 145 cm3 with XYZ dimensions of about 4 cm by about 12 cm by about 3 cm. Most preferably, the cell volume is less than about 100 cm3 with XYZ dimensions of about 4 cm by about 8 cm by about 3 cm. These dimensions minimize heat transfer due to both forced and natural convection.

Figure 4:
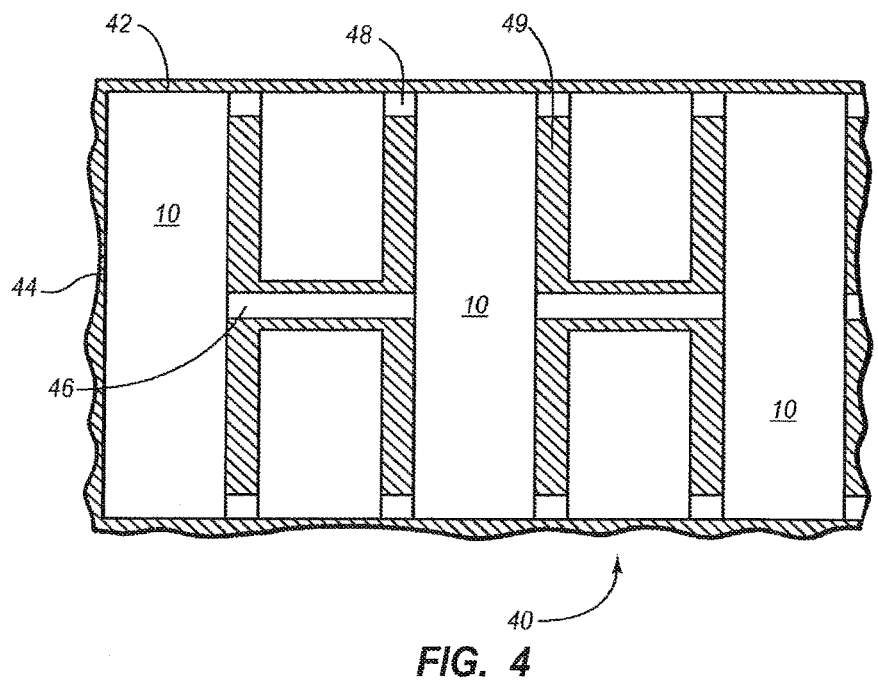
FIG. 4 illustrates yet another alternate arrangement of a plurality of insulating gas cells that are in fluid connection with one another.

FIG. 4 depicts another alternate arrangement of a plurality of cells 10 to form an insulative article 40. The arrangement is similar to the arrangement depicted in FIG. 2. The cells 10 are formed as open space between two sheets of gas impermeable material that are bonded together to form a plurality of cells 10. Bonded regions 49 are formed between the cells 10. The cells are in fluid connection with one another via connector tubes (46 and 48) between the cells.

As in previous examples, each of the plurality of cells 10 have an X dimension 42, a Y dimension 44, and a Z dimension (not shown). The XYZ dimensions are chosen according to the preferred Rayleigh value of less than 300,000 so as to minimize heat loss through convection of the gas within the cells 10.

Figure 5:
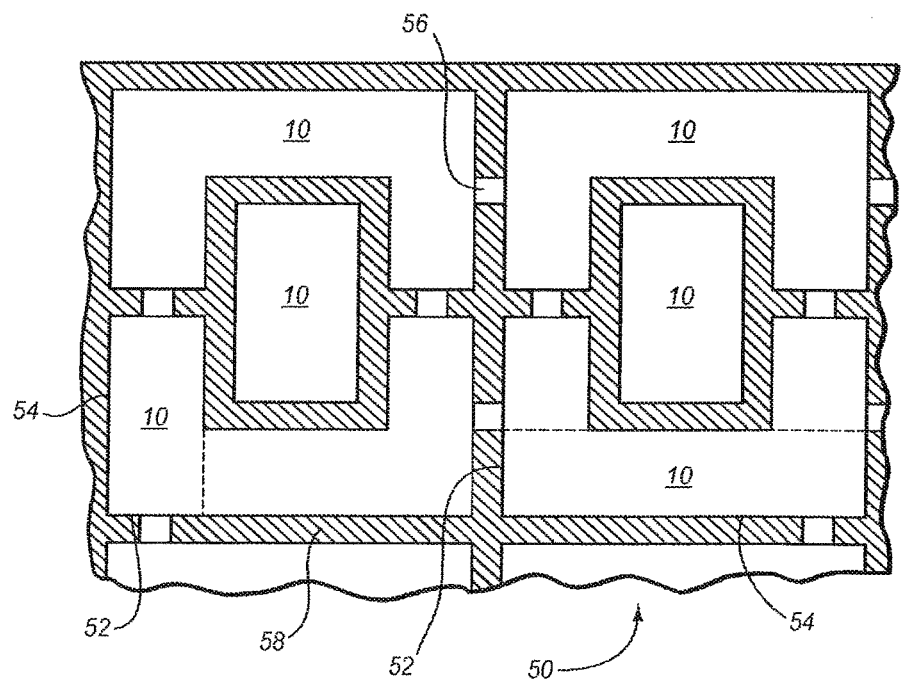
FIG. 5 illustrates even yet another alternate arrangement of a plurality of insulating gas cells that are in fluid connection with one another.

FIG. 5 depicts another alternate arrangement of a plurality of cells 10 to form an insulative article 50. The arrangement is similar to the arrangement depicted in FIG. 3. The cells 10 are formed as open space between two sheets of gas impermeable material that are bonded together to form a plurality of cells 10. Bonded regions 58 are formed between the cells 10. The cells are in fluid connection with one another via connector tubes 56 between the cells.

As in previous examples, each of the plurality of cells 10 have an X dimension 52, a Y dimension 54, and a Z dimension (not shown). The XYZ dimensions are chosen according to the preferred Rayleigh value of less than 300,000 so as to minimize heat loss through convection of the gas within the cells 10.

In one embodiment, the insulative articles depicted in FIGS. 2-5 may be used to insulate outdoor apparel. Exemplary outdoor apparel items include, but are not limited to, coats, parkas, jackets, vests, gloves, mittens, hats, liners, and boots.

In one embodiment, the insulative articles depicted in FIGS. 2-5 may be used to insulate outdoor gear. Exemplary outdoor gear items include, but are not limited to, tents, sleeping bags, bivouac bags, and sleeping pads.

III. Methods for Making an Insulative Article

A method for manufacturing a lightweight, gas-filled, highly insulative material can include all or apportion of the following steps: (1) providing a first sheet of a gas impermeable material and a second sheet of a gas impermeable material; (2) welding the first and seconds sheets of gas impermeable material together to form a chamber having a cell structure comprising a plurality cells that are in fluid communication; (3) providing a valve mechanism configured to allow an insulating gas to be introduced into and removed from the plurality of cells; and (4) filling the plurality of cells with a dry insulating gas selected from the group consisting of argon, krypton, xenon, carbon dioxide, sulfur hexafluoride, and combinations thereof. In an alternative embodiment, dry atmospheric air can also be used, although the foregoing dry gases are preferred. Preferably, the insulating gas used to fill the plurality of cells has a moisture content less than about 4 percent by weight. More preferably, the insulating gas used to fill the plurality of cells has a moisture content less than about 2 percent by weight. Most preferably, the insulating gas used to fill the plurality of cells has a moisture content less than about 1 percent by weight.

In one embodiment, the first and second sheets that form the cellular structure comprise a fabric, such as nylon, polyester, or spandex, bonded or laminated to a gas impermeable material. Preferably the materials used to form the insulative material are flexible such that the insulative material can be wearable or useable next to a person's body. Examples of suitable gas impermeable materials include, but are not limited to, polyethylene, polypropylene, polyurethane, urethane, silicone rubber, latex rubber, polytetrafluoroethylene (PTFE), expanded PTFE, butyl rubber, and Mylar. In one embodiment, a portion of the bladder can also be formed of a Kevlar material and/or a laminated Kevlar material. The lamination can be any gas impermeable material or composition.

Exemplary techniques for joining the first and seconds sheets of gas impermeable material together to form a chamber having a cell structure comprising a plurality cells that are in fluid communication include, but are not limited to, ultrasonic welding, laser welding, stamp heat welding, hot plate welding, gluing, taping, sewing, and other fabric joining techniques known by those having skill in the art, such as, but not limited to weaving, including one piece woven fabrics. For example, the repeating patterns of cells, examples of which are depicted in FIGS. 2-5, can be formed by joining two sheets of gas impermeable fabric together with an ultrasonic welding drum or a hot plate welding drum that is machined to impress the pattern into the sheets of fabric. Alternatively, the two sheets can be woven together as one piece and sealed to form chambers using techniques known in the art of making airbags.

Heat loss through the article is lessened if convective mixing of the gas in the plurality of cells is minimized. In turn convective mixing of the gas in the plurality of cells is minimized if the dimensions are such that the Rayleigh value, which is a function of the cell dimensions, is below about 300,000. In one embodiment of the present invention, the method further comprises choosing a volume and cell dimensions for each of the plurality of cells such that the Rayleigh value of each of the plurality of cells is less than about 300,000. Based on a preferred Rayleigh value of less than about 300,000, preferred dimensions for each of the plurality of cells 10 depicted in FIG. 3 were determined. Preferably, the cell volume is less than about 300 cm3 with XYZ dimensions of about 7 cm by about 14 cm by about 3 cm. More preferably, the cell volume is less than about 145 cm3 with XYZ dimensions of about 4 cm by about 12 cm by about 3 cm. Most preferably, the cell volume is less than about 100 cm3 with XYZ dimensions of about 4 cm by about 8 cm by about 3 cm. These dimensions minimize heat transfer due to both forced and natural convection.

In one embodiment, the method disclosed herein further comprises incorporating the insulative material into an article of outdoor apparel and/or outdoor gear. Exemplary articles of outdoor apparel and/or outdoor gear include, but are not limited to, coats, parkas, jackets, vests, pants, gloves, mittens, hats, liners, snow boots, work boots, ski boots, snowboard boots, tents, sleeping bags, bivouac bags, and sleeping pads. The insulative material can be an integral component of the article of outdoor gear or apparel. For example, the insulative material can form part of the wall of a jacket or ski pant. The insulative material can be used to make a hat where all or part of the hat is the insulative material with a cellular structure. The insulative material can be used as a liner in a sleeping bag or it can be sewn such that the insulative material is a permanent component of the sleeping bag. The liner can be used as the fabric portion of the wall of a tent. The insulative material can be used in the floor of the tent to provide a barrier between a person and the ground. In addition, the insulative material can be used as a sleeping pad to provide insulated separation between a person and the ground.

Alternatively, the insulative material can be overlaid or attached as a liner to the article of outdoor gear or apparel. In this case, the insulative material can be attached using a zipper, snaps, hook and loop fastener (i.e., Velcro), or any other suitable connection means. In one embodiment, the insulative material can be incorporated into a vest or jacket that can zip into the shell of a coat. This mechanism allows the insulative material to be selectively used or removed depending on weather condition.

Figure 6:
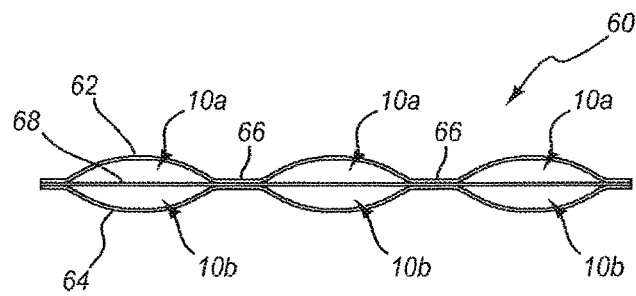
FIG. 6 illustrates a side cross-sectional view of a plurality of insulating cells divided by an intermediate layer.

FIG. 6 illustrates an insulative laminate that may include cells, such as the cells 10 described hereinabove. The cells 10 are formed by an upper layer 62 and a lower layer 64 secured to one another at seams 66 to form cells having the shapes illustrated in FIGS. 2 through 5.

In order to further reduce convection for a cell size having a given size in the XY plane, an inner layer 68 may be positioned between the upper layer 62 and lower layer 64 in order to form cells 10a and 10b having reduced volume. In some embodiments, the inner layer 68 is gas permeable, whereas in others it is gas impermeable. The inner layer 68 may also be insulative in order to further increase the insulative properties of the article 60. In one embodiment, the inner layer 168 is a closed cell foam or an open celled foam. Open celled foam can be used where the insulative article is to be compressed (e.g., for storage). The open celled foam allows the insulative gas to flow out of the foam cells when the bladder is being deflated and the article compressed. In a preferred embodiment, the inner layer 66 is formed of an insulative synthetic fiber such as THINSULATE™, PRIMALOFT™, or the like. The inner layer 68 inhibits convection within the cells thereby reducing heat transfer. As with other embodiments described herein, an insulative gas, such as argon may be injected into or released from the cells 10.

The inner layer 68 may be secured to the upper layer 62 and 64 by the seams 66. The seams 66 may be formed according to the methods described hereinabove. In some embodiments, where the seams 66 are formed by ultrasonic, or other, welding techniques, the upper layer 62 and lower layer 64 may permeate the inner layer 68 in order to secure to one another and the inner layer 68.

Figure 7:
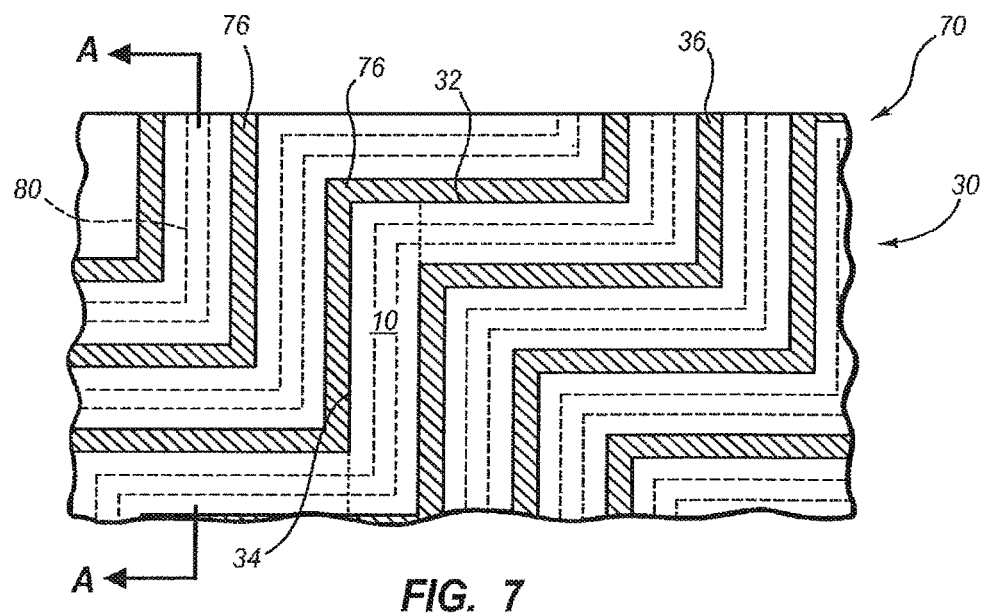
FIG. 7 illustrates an offset arrangement of a plurality of insulating cells.
Figure 8:
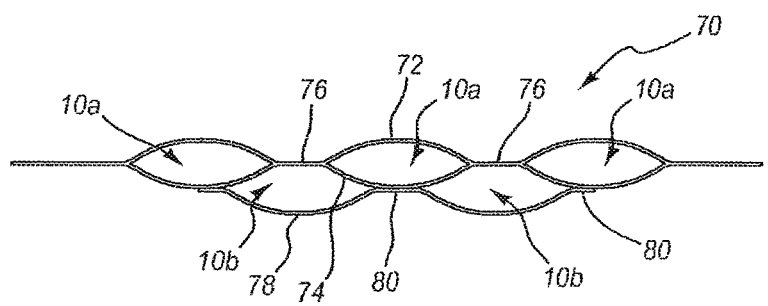
FIG. 8 is a side cross-sectional views of a plurality of insulating cells having the offset arrangement of FIG. 7.
Figure 9:
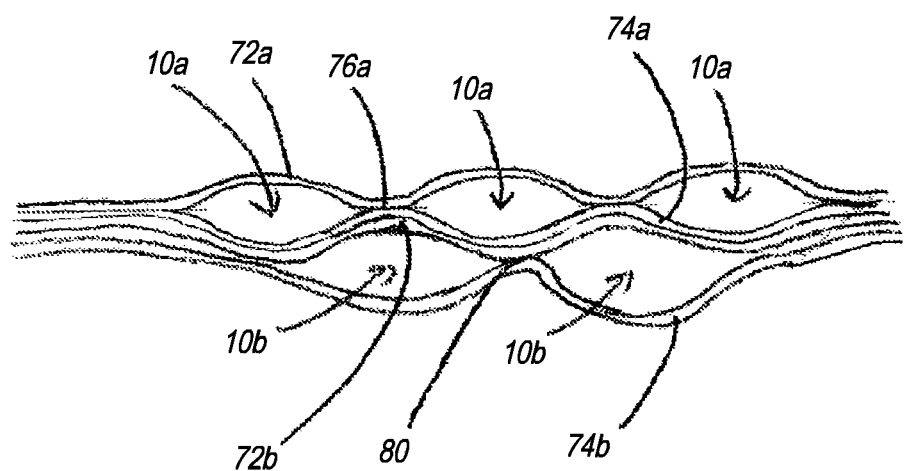
FIG. 9 is a side cross-sectional views of a plurality of insulating cells having the offset arrangement of FIG. 7.

In another embodiment of an insulative laminate 70 is illustrated in FIGS. 7 through 9. In the embodiments of FIGS. 7 through 9, the cells 10 are formed by an upper layer 72 and a middle layer 74 secured to one another at walls 76 to form cells 10a having the shapes illustrated in FIGS. 2 through 5. In the embodiment of FIG. 8, a lower layer 78 is secured to the middle layer 74 by means of walls 80. The walls 80 are offset from the wall 76. In some embodiments, the walls 80 may define cells 10b that likewise have the shapes illustrated in FIGS. 2 through 5. Alternatively, the walls 80 may form cells having different shapes. In some embodiments, the walls 80 cross the wall 76. However, in a preferred embodiment, over 90 percent of the lengths and/or areas of the walls 80 are not collocated with one of the wall 76. The article 70 of FIGS. 7 and 8 may be formed by first welding the upper layer 72 to the middle layer 74, positioning a spacer in the cells 10a defined by the layers 72, 74 and wall 76, and then welding the lower layer 76 to the middle layer 74. In an alternative embodiment, layers 72, 74, and wall 76 and 80 can be formed using a weave such as one piece woven technology.

The spacer may have the effect of preventing the upper layer 72 and lower layer 74 from being further joined together when the lower layer 76 is joined to the middle layer 74. Alternatively, as in the embodiment of FIG. 9, the laminate 70 may be formed by coupling an upper layer 72a to a lower layer 74a by means of wall 76 and coupling an upper layer 72b to a lower layer 74b by means walls 80. The lower layer 74a may then be coupled to the upper layer 72b by means of an adhesive or other fastening means. The wall 76a are preferably offset from the walls 80 as in the embodiment of FIG. 8. As with other embodiments described herein, an insulative gas, such as argon may be injected into or released from the cells 10. The present invention includes insulative materials with any number of layers having cells and or subcells formed therein. In addition, all or some of the layers may be offset or patterned so as to layer cells of one layer above the seams of another layer.

Figure 10:
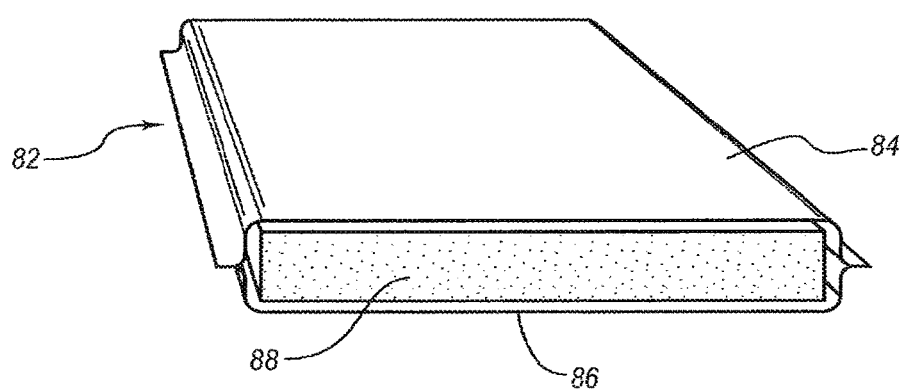
FIG. 10 is a front cross-sectional view of an air bladder having an open cell foam core.

Referring to FIG. 10, in another embodiment, an insulative pad 82 is formed of an upper layer 84 and a lower layer 86 joined at their perimeters to define a cavity. A foam layer 88 may be positioned between the upper layer 84 and lower layer 86. The foam layer 88 is preferably formed of an open cell foam. The foam layer 88 preferably occupies substantially the entire volume defined by the upper layer 84 and lower layer 86, such as between 80 and 95 percent of the volume. The pad 82 may be sized to support a sleeping person. For example, the upper layer 84 and lower layer 86 may define a volume have a width of between 60 and 80 centimeters, a length of between 170 and 200 centimeters, and a height of between 3 and 10 centimeters. As with other embodiments described herein, an insulative gas such as argon may be injected into or released from the pad 82 by means of a valve or some other means permitting the inflation and deflation of the pad 82.

Figure 11:
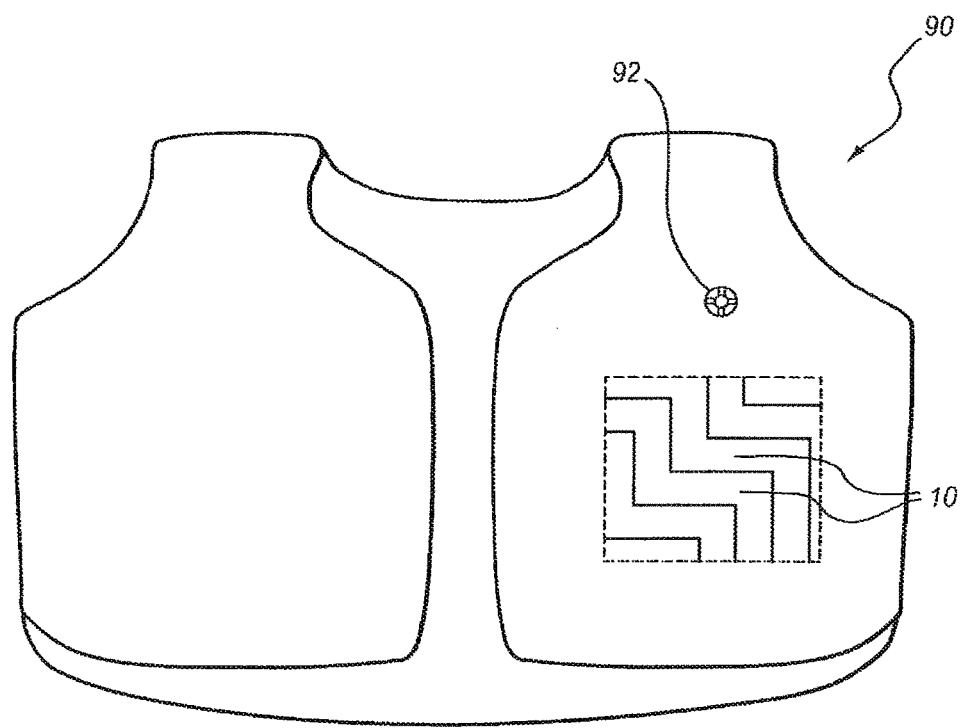
FIG. 11 is a front view of a wearable item incorporating the plurality of insulating cells.

Referring to FIG. 11, a wearable item 90, such as a vest, jacket, glove, pants, boot, or the like. The wearable item 90 includes cells 10 formed according to any of the cells described with respect to FIGS. 2 through 9. The cells 10 may be in fluid communication with an inlet valve 92. The inlet valve 92 may be secured to an outer surface of the wearable item. The inlet valve 92 may be secured to the wearable item 90 by means of adhesive, welding, or the like.

IV. System for Inflation of Insulative Material

The present invention includes an inflation system for inflating and deflating a gas bladder of an insulative material as described above. As described above with reference to FIG. 1, the inflation system includes a bladder 10, a gas reservoir 12 and a valve 16. Embodiments disclosed herein describe portable filling systems in which a valve can be incorporated therein. In a first embodiment, the valve is included in a removable filling system that can be selectively attached and removed from the bladder in the article of outdoor gear or apparel. In one embodiment, the portable filling system can provide a custom control for incrementally inflating and deflating the bladder using a switch. In yet another embodiment, the filling system includes a pump for moving dry gas in and/or out of the bladder and in and/or out of a reservoir.

A. Removably Connected Filling System

Referring to FIG. 11, an inflation system includes the valve 92 may be selectively coupled to a portable filling apparatus 94. The filling apparatus 94 may include a gas reservoir 96, a housing 98, an outlet valve 100, an outlet orifice 102, and a shroud 104. The gas reservoir 96 is secured to the housing 98, such as by means of threads formed on the reservoir 96 engaging corresponding threads on the housing 98. In some embodiments, a spike 99 may be positioned to pierce a membrane of the gas reservoir as the reservoir 96 is threaded into the housing 98. The gas reservoir 96 is in fluid communication with the valve 100 such that the valve 100 controls the release of gas from the reservoir 96 when it is coupled to the housing 98. The valve 100 is preferably manually actuated, such as by means of pressing a button or lever. The valve 100 is in fluid communication with the outlet orifice 102 such that gas is released through the orifice 102 when the valve 100 is manually actuated. In some embodiments, a pressure regulator 105 may be positioned in the fluid path between the gas reservoir 96 and the orifice 102 to reduce the output pressure. The shroud 104 surrounds the orifice 102 and performs at least one of two functions: coupling the portable filling apparatus 94 to the valve 92 of the wearable item 90 and providing a seal between the valve 92 and itself. In some embodiments, a post 106 projects outwardly adjacent the orifice in order to depress the valve 92 when the portable filling apparatus 94 is engaged with the valve 92.

Figure 13:
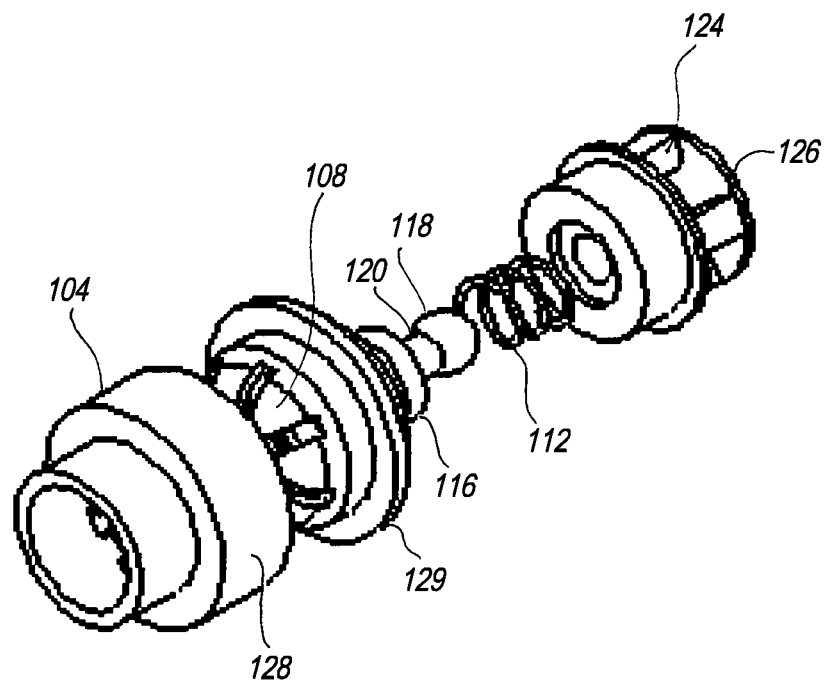
FIG. 13 is an exploded perspective view of a bladder valve.
Figure 14:
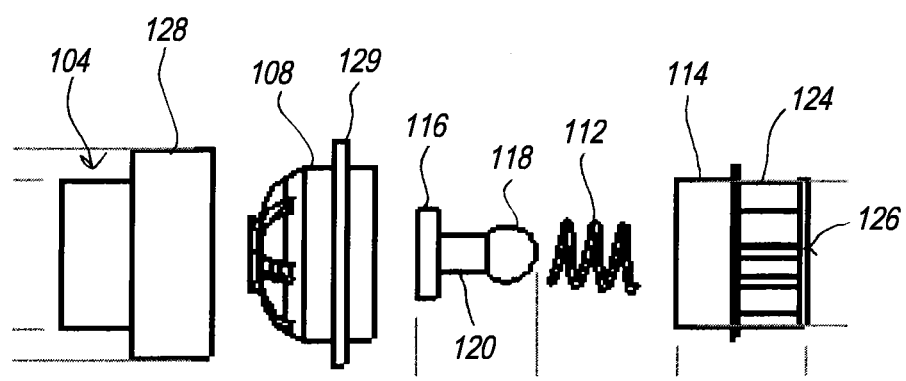
FIG. 14 is a side view of the bladder valve of FIG. 13.

Referring to FIGS. 13 and 14, the valve 92 may include a flexible valve cover 108, valve plunger 110, spring 112, and housing 114. The flexible valve cover 108 is exposed when the valve 92 is secured to the outer surface of the wearable item 90. The flexible valve cover 108 is preferably vented such that gas may pass therethrough. In one embodiment, the flexible valve cover 108 is formed of a flexible rubber, such as polyurethane, or the like.

The flexible valve cover 108 projects outwardly from the surface of the wearable item 90 and changes shape in response to pressure imposed by the post 106. Upon deformation, the valve cover 108 may be forced against the plunger 110. The plunger 110 includes an actuation surface 116 at one end and a valving surface 118 at the opposite end, having a narrow stem 120 extending therebetween. The plunger 110 passes through an aperture 122 in the housing 114. The spring 112 is positioned between the actuation surface and the housing 114 such that the valving surface 118 is biased against the aperture 122 to create a seal. Upon depressing the valve cover 108, the plunger 110 is urged through the aperture 122 such that the valving surface 118 is urged away from the aperture 122, thereby permitting air to pass around the narrow stem 120 through the aperture 122.

The housing 114 may include standoffs 124 secured at one end adjacent the aperture 122 and at an opposite end to a back plate 126 such that the aperture 120 is not obstructed by the material forming the wearable item 90.

The portable filling apparatus 94 may include means for hindering decoupling of the portable filling apparatus 94 from the valve 92. The means for hindering decoupling may also function as means for creating a seal between the portable filling apparatus 94 and the valve 92.

For example, the portable filling apparatus 94 may be coupled to the valve 92 by means of a friction fit mechanism. In such embodiments the shroud 104 includes a cylindrical wall 128 having an inner diameter that is slightly smaller than an outer diameter of the flexible valve cover 108. The shroud 104 can therefore be retained in engagement with the valve cover 108 by means of friction, creating both a seal and hindering removal of the shroud from the valve cover 108. One or both of the inner surface of the cylindrical wall 128 and the outer surface of the flexible valve cover 108 may include a circumferential lip in order to enhance friction and promote sealing.

In other embodiments, the portable filling apparatus 94 may be coupled to the valve 92 by means of a snap-connect mechanism. The snap connect can include a spring loaded valve that is actuated by coupling of female and male couplers. The snap connect can use any female male coupler system known in the art of quick snap connectors so long as the connector provides a seal suitable for inflating the bladder. In a preferred embodiment, the quick connect includes a spring loaded release mechanism that biases a female and a mail connector against one another when connected thereto. Examples of quick connectors that can be used include quick snap connectors for plastic tubing sold by Colder Products (St. Paul, Minn.).

In still other embodiments, the portable filling apparatus 94 may be coupled to the valve 92 by means of magnet coupler. For example wall 128 of shroud 128 and rim 129 can be made of magnetically attractive materials that draw the connectors together and hinder the removal thereof so as to facilitate a seal and to actuate valve 92.

Figure 12:
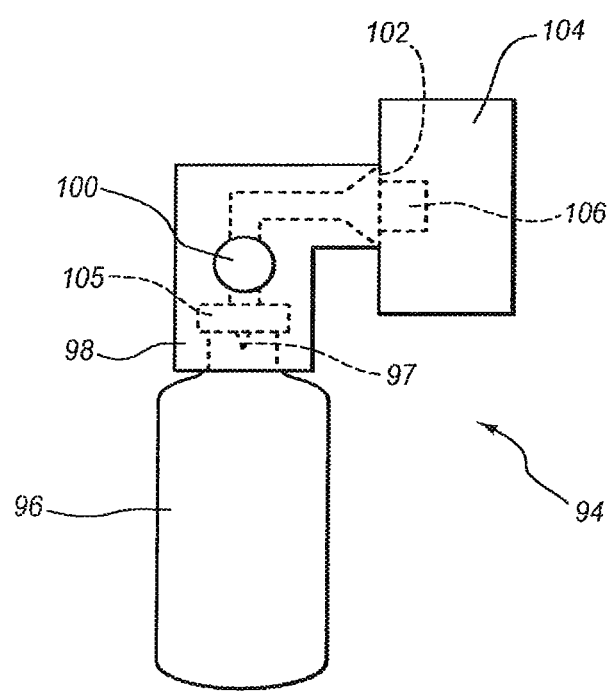
FIG. 12 is a front view of a portable gas filling system for inflating a bladder of an article of outdoor gear or apparel.

The foregoing structures described with regard to FIGS. 12-14 include example structure for coupling the filling apparatus 94 to a connector affixed to an article of outdoor gear and apparel so as to hinder removal thereof. The foregoing structures that provide a friction fit, snap fit, and magnetic coupling are examples of means for coupling a connector (e.g., an orifice) of the portable filling apparatus to a connector on the bladder valve. Other suitable structure includes a twist lock mechanism, wherein a keyway on the orifice or the bladder valve engages a groove on the other of the bladder valve or orifice and the key prevents removal of the orifice from the bladder valve until the orifice is rotated relative to the bladder valve. This embodiment can be useful where the portable filling device remains attached to the bladder valve for an extended period of time (e.g., hours or days).

B. Incremental Inflation and Deflation Filling System

In one embodiment, the inflation system can be configured to allow a user to incrementally control the inflation and deflation of a bladder incorporated into an article of outdoor gear or apparel. The incremental inflation system includes a switching mechanism that switches between an inflation state, a deflation state, and steady state. The switching can be carried out using one or more valves configured to allow dry gas to fill the bladder from a dry gas reservoir and a second valve or a second configuration of a first valve that allows and/or pumps the dry gas from the bladder to the ambient air or a dry gas reservoir, which may or may not be the same dry gas reservoir used to initially fill the bladder. FIGS. 15-18 shows filling systems using various mechanisms to control the amount of gas in a bladder and therefore the amount of insulation provided in an article of outdoor gear or apparel.

Figure 15:
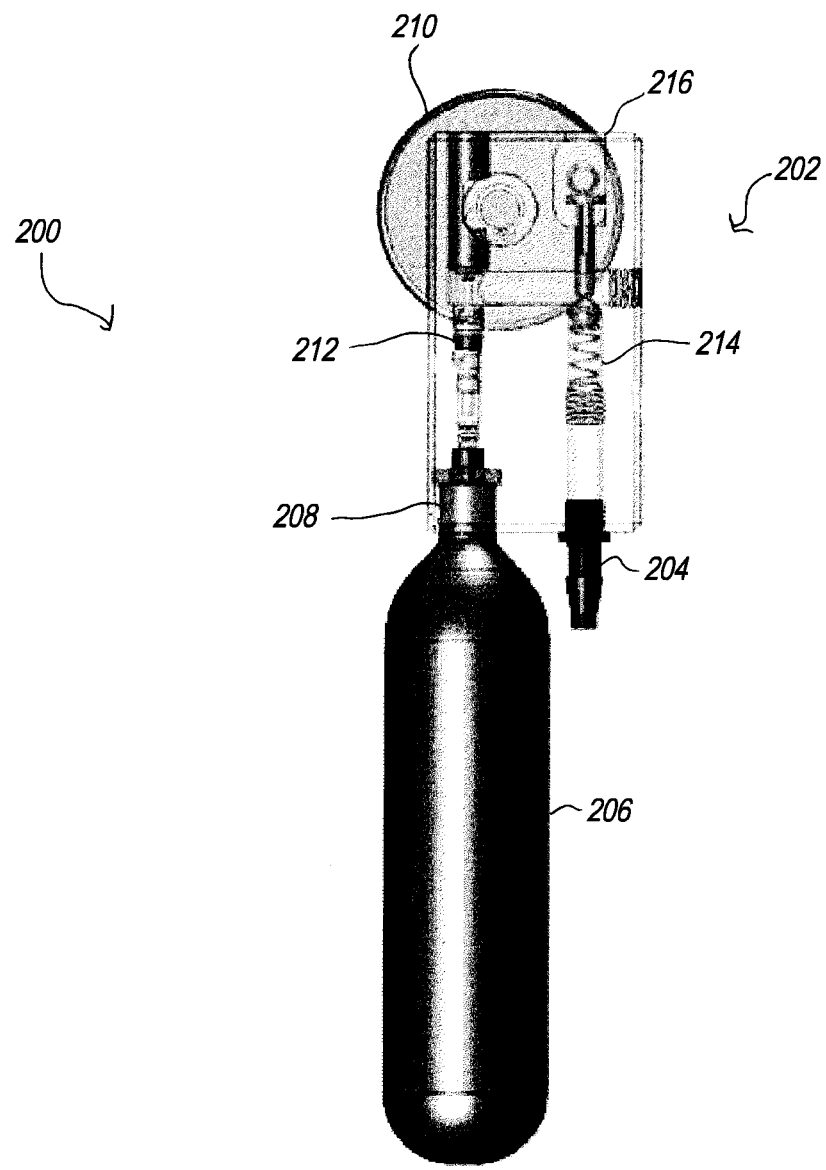
FIG. 15 illustrates a dial switch mechanism.

FIG. 15 illustrates one embodiment of a filling system 200 that includes a dial mechanism that allows a user to incrementally control the amount of inflation in a bladder of an article of outdoor gear or apparel. FIG. 15 shows a detailed back side view of the filling system 200, which includes the dial mechanism 202. System 200 can be permanently incorporated into the article of outdoor gear or apparel or configured to releasably connect to a connector affixed to the article of outdoor gear or apparel. Connector 204 allows system 200 to be connected to tubing in fluid communication with a bladder such as those discussed above in detail with respect to FIGS. 1-11. Dial mechanism 202 may also be threadably connected to canister 206 through canister connection 208, which provides a seal suitable for the pressure in canister 206.

FIG. 15 illustrates a system 200 with a dial switch 210. In the depicted embodiment, rotating the dial switch 210 counter-clockwise actuates a Schrader-type valve 212 that allows gas to travel from the canister 206, through dial mechanism 202 and out connector 204 and through tubing to a bladder incorporated into an article of outdoor gear or apparel. In the depicted embodiment, rotating the dial switch 210 clockwise actuates a second Schrader-type valve 214 that allows dry gas to flow from a bladder and tubing into connector 204 and out of a port 216 in fluid communication with valve 214. Dial 210 can be spring loaded to return to a neutral position in which neither of valves 212 or 214 are actuated without the users maintaining the dial 210 in the rotated position.

Figures 16, 17:
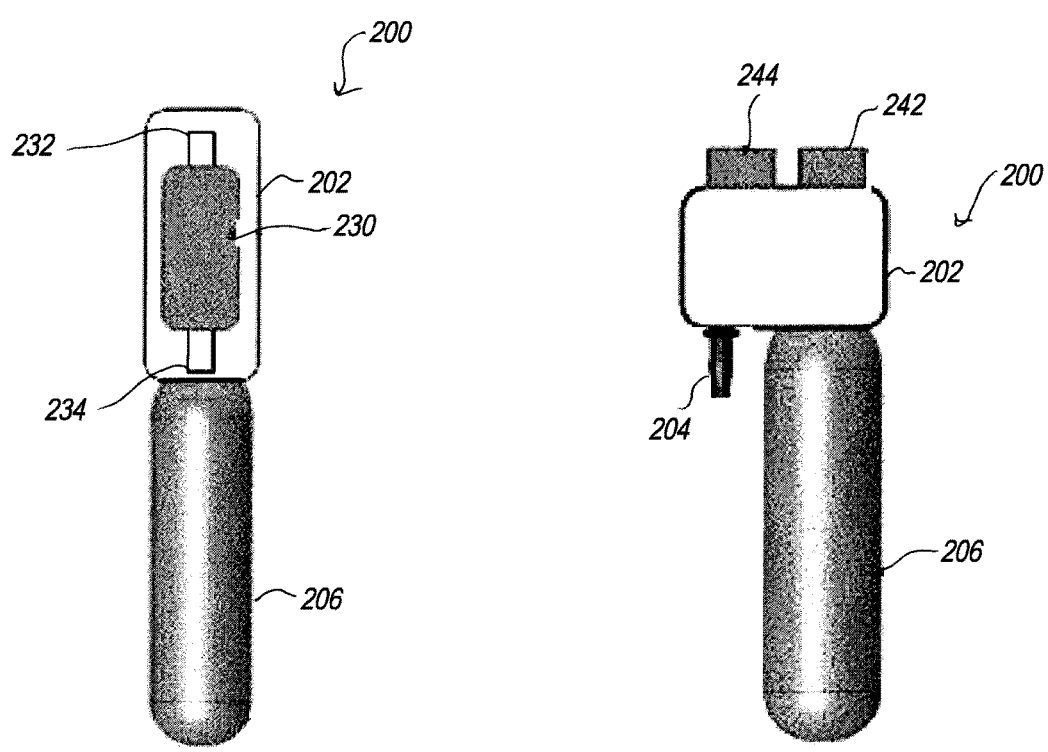
FIG. 16 illustrates a slider switch mechanism.
FIG. 17 illustrates a two button switch mechanism.

FIG. 16 illustrates a slider switch 230 is used to actuate a plurality of valves as illustrated in FIG. 15. Slider switch 230 is shown in a neutral position, which does not cause inflation or deflation of a bladder. Slider switch 230 can be moved to an upper position 234 to actuate valve 212 and cause inflation as described above; or, slider switch 230 can be slid down to position 234 and actuate valve 214 and cause deflation of a bladder as described above. Slider switch 230 may be biased using a spring to maintain the illustrated neutral position absent a force by the user to move slider switch 230 to the upper position 232 or lower position 234.

FIG. 17 illustrates a dual push button switch system 202. In this embodiment system 202 Includes a first button 242 that actuates valve 212 to cause inflation of a bladder incorporated into an article of outdoor gear and apparel as described above with respect to FIG. 15. Push button 244 can actuate valve 214 to cause deflation of a bladder as described above. By selecting either button 242 or 244 for a desired amount of time, a user can incrementally increase or decrease the amount of gas in a bladder incorporated into an article of outdoor gear or apparel and thereby customize the amount of insulation provided by the bladder (i.e., more gas provides more insulation and less gas provides less insulation.) The foregoing systems allow a user to have custom insulation in the article of outdoor gear or apparel using the filling systems and bladders described herein.

In one embodiment, system 202 can also include a regulator that steps down the pressure in canister 206 to a lower pressure. Pressure regulators for stepping down the pressure are own in the can include a regulator that reduces the high pressure in the canister to a lower pressure that can be used in the bladder system 2. For example, miniature regulators produced by both Genuine Innovations of Tucson, Ariz. and Beswick Engineering may be incorporated into the systems described herein.

When a pressure regulator is used an individual can control the amount of gas introduced into the jacket to a set pressure and while the canister is still connected the bladder will maintain that pressure in the bladder by letting more gas into the bladder if the pressure drops below a set pressure for the regulator. When a valve system using a constricting orifice is used, the user may control the amount of pressure into the bladder by actuating the slider, dial, or push button as described above.

C. Pumping Systems

In some embodiments described herein, a pump can be incorporated into the filling system to move dry gas out of or into the bladder. The pump can be a hand pump such as a bulb pump such as those used with blood pressure cuffs. Alternatively, the pump can be an electric micro pump that operates using battery power. In one embodiment, the pump can be used to electronically control the inflation and/or deflation of the bladder. In another embodiment, the pump can serve the purpose of recovering dry gas from the bladder such that the dry gas can be reused at a later point in time when additional insulation is desired.

Figure 18:
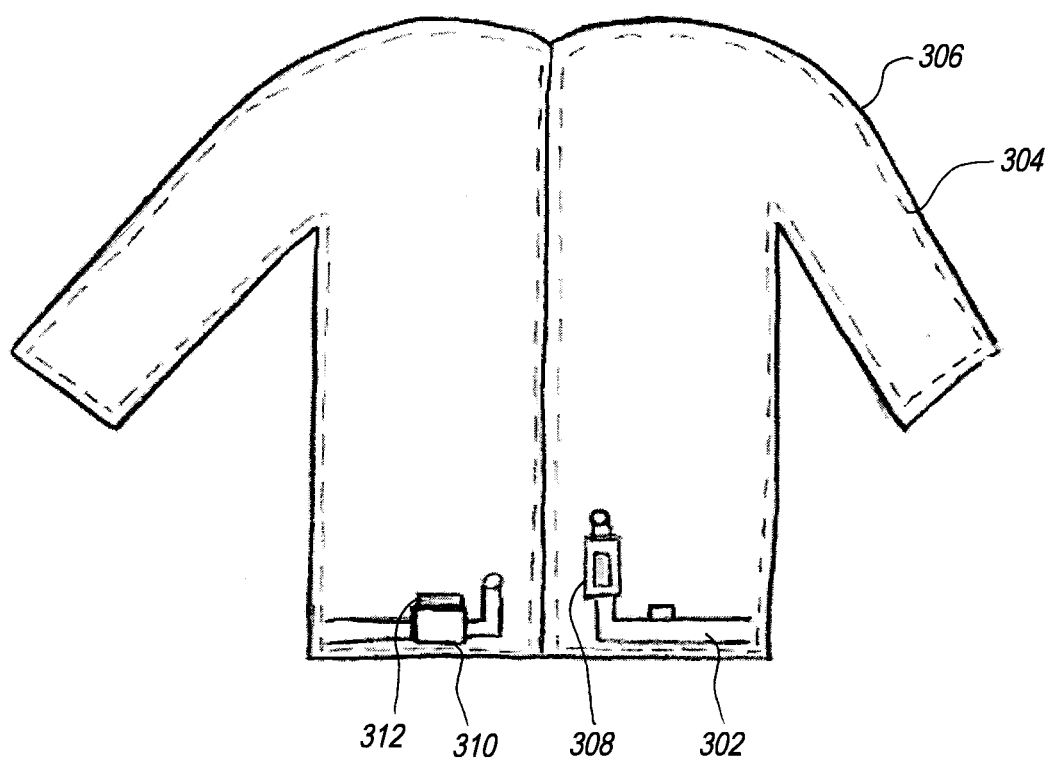
FIG. 18 illustrates a pump system incorporated into a jacket.

FIG. 18 illustrates a system 300 incorporated into a jacket in which a low-pressure reservoir 302 is used to store gas removed from bladder system 304 of a jacket 306. In one embodiment, reservoir 302 can be used to refill bladder system 304. Optionally, a high pressure reservoir as described above can also be coupled to bladder 304 using the techniques described above.

In FIG. 18, jacket 306 includes integrated bladder system 304, which is connected to a control system 308, which controls the amount of gas entering into and out of the bladder system 304. The control system 306 includes a microprocessor, a pressure sensor, and an input mechanism that allows the user to indicate a desired amount of insulation. A pump mechanism 310 is configured to be in fluid communication with bladder system 304, which allows the gas to be pumped out of the bladder system 304 into a reservoir system 302. The pump 310 is powered by a small battery 312. The reservoir system 302 is pumped to a higher pressure than that which is used in the bladder system 304. The increase in pressure in the reservoir system preferably, is in a range from about 15 psi to about 200 psi. More preferably, the pressure in the gas cylinder is in a range from about 30 psi to about 150 psi. Most preferably, the pressure in the gas cylinder is in a range from about 50 psi to about 100 psi. The reservoir system 302 can be constructed of a high strength flexible rubber such as PVC, silicone or, polypropylene that can withstand a maximum pressure of 200 psi. A non-permeable coating can be placed on the rubber to further decrease the possibility of gas contained in the reservoir system 302 from leaking out. The reservoir system 302 can be optimized to contain the largest amount of gas, while maintaining the pressure at a moderate pressure (3-200 psi) and limiting the intrusiveness of the reservoir system 302 on the user.

The reservoir system 302 is shown in FIG. 18 integrated around the waist line as a single tube, however, other configurations can be used. For example, the reservoir system 302 can be broken up into a series of tubes and/or reservoirs connected together by small tubes which gives the reservoir system increased flexibility. Also, the reservoir system 302 does not have to be placed along the waist line. Moreover, the pump system can be incorporated into other articles of outdoor gear and apparel.

The pump system 300 allows the dry gas in bladder 304 to be reused without depleting it into the atmosphere when a user deflates the bladder for the purpose of decreasing insulation. This allows the dry gas to be reused when the user wants increased insulation, such as when the elements surrounding the user change.

VI. Gas Canisters

Some embodiments of the invention as described above and/or as will be apparent to those in the art advantageously include the use of a gas canister as the reservoir of dry gas (although a gas canister is not required for some embodiments described above). The gas canisters preferably have a size and configuration that is suitable for the particular article of outdoor gear or apparel that is being inflated. In a preferred embodiment, the gas canister is a portable canister. In some embodiments, the portable canister can be a handheld canister that allows a user to engage in activities such as skiing and hiking while transporting the canister.

Figure 19:
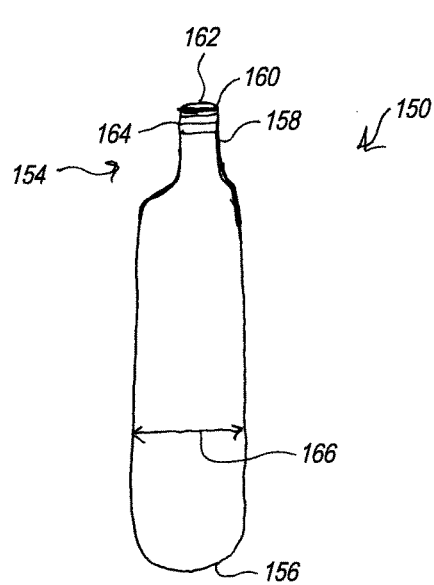
FIG. 19 illustrates a gas canister.

Referring now to FIG. 19, the present invention includes a high pressure gas canister 150 configured for use in a gas filling apparatus 94, as described above, to fill an insulative material as described herein. The gas canister can be configured to deliver suitable amounts of an inert gas for inflating a thermal insulative material with an insulative gas. In one embodiment, the gas canister includes a cylinder having an elongate body that extends from a distal end 154 to a proximal end 156, the cylinder body narrowing at the distal end 154 to form a neck 158. The neck has an opening 160. The opening allows an inert gas to be charged and discharged from cylinder 152. A rupturable membrane 162 seals opening 160 after cylinder 152 is filled. Rupturable membrane 162 is ruptured upon use to allow the insulative gas to be delivered to a gas bladder. Threads 164 are disposed on the neck for engaging corresponding threads in the housing of gas filling apparatus 94 (FIG. 11) or other gas dispensing apparatus.

A dry gas is disposed in cylinder 152. In one embodiment, the dry gas has a configuration as described above. For example, the dry gas can have a water content less than about 4 weight percent. In addition, the dry gas can be one or more of argon, krypton xenon, or sulfur hexafluoride. The inert gas is compressed in the canister at a pressure of at least 2200 psi, more preferably at least about 2500, even more preferably at least about 3000, and most preferably at least about 3500 psi or higher. Pressures of at least 2200 psi are important for some embodiment where a relatively large bladder is used. For example to fill an adult size jacket with argon, a pressure of 2200 provides sufficient pressure to ensure that the jacket can be fully inflated. The higher pressures listed above are preferred because they allow additional fills of a jacket or other article without reconnecting a new canister. Using higher pressures is important to some applications in order to obtain a canister that is reasonably portable, light weight, cost effective, and provides sufficient gas for inflating an article of outdoor gear and apparel.

For the gas canister to be useful in some cold weather applications, the canister must include a gas that undergoes little or no liquefaction at ambient temperatures and pressures in a range from 2000-6000 psi. If the gas in the canister is a liquid (e.g., carbon dioxide), rapid expansion of the gas causes cooling, which can cause a gas filling apparatus to malfunction in cold weather. Examples of suitable insulative gases that can be compressed to high pressures without substantial liquefaction include argon, krypton, xenon, and nitrogen. For purposes of this invention, the term nitrogen shall mean diatomic nitrogen, unless otherwise specified. Argon and krypton are particularly preferred for their insulative properties in addition to their suitability for being compressed in a gas canister and rapidly expanded through a gas filling apparatus.

The threads of the gas canister allow the gas canister to be securely attached to a gas filling apparatus. In embodiments where high pressure is required, the threads allow the canister to be attached to the gas filling apparatus in a safe manner. The canister, which is made from a very strong material (e.g., steel) can provide the needed contact for withstanding the higher pressures, particularly during removal and connection of the gas canister to the gas filling apparatus. In addition, the thread pattern allows canisters of different sizes to be attached to the same gas filling apparatus. This is highly advantageous for users who have different articles of outdoor gear or apparel that include an insulative material according to the invention and that might require the use of different sized canisters and/or canisters with different gasses (e.g., argon or nitrogen).

In one embodiment of the invention, the gas canister is properly sized for portability and use with a particular article of outdoor gear or apparel as described herein. In one embodiment, the gas canister has a maximum diameter 166 that is in a range from 0.5 inch to about 6 inches, more preferably about 0.6 inch to about 2 inches, and most preferably about 0.75 inches to about 1.25 inches.

Figure 20:
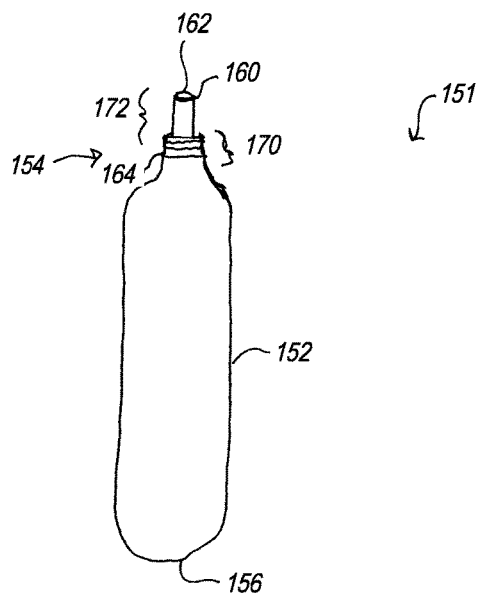
FIG. 20 illustrates an alternative embodiment of a gas canister.

FIG. 20 describes an alternative embodiment that includes a gas canister 151 having a novel neck design that is advantageous for forming a high pressure seal with a filling apparatus according to embodiments described herein. FIG. 20 illustrates a canister 151 that includes a cylinder 152 and an elongate body that extends from a distal end 154 to a proximal end 156, the cylinder body narrows at the distal end 154 to form a neck 158. The neck has an opening 160. The opening allows an inert gas to be charged and discharged from cylinder 152. A rupturable membrane 162 seals opening 160 after cylinder 152 is filled.

Neck 158 includes a threaded portion 170 and a smooth portion 172. Threads 164 are disposed on the threaded portion for engaging corresponding threads in a housing of gas filling apparatus, which is described below with respect to FIG. 21. Smooth portion 172 has a narrower diameter than threaded portion 170 and extends more distally to threaded portion to allow the smooth portion 172 to be inserted into a channel to form a seal with the receiving apparatus (e.g. filling system 94). The diameter of the threaded portion and the smooth portion will depend on the overall size of the canister. However, the smooth portion is typically at least about 5% smaller in diameter, alternatively at least about 10% smaller in diameter or even at least about 20% smaller in diameter.

Figure 21:
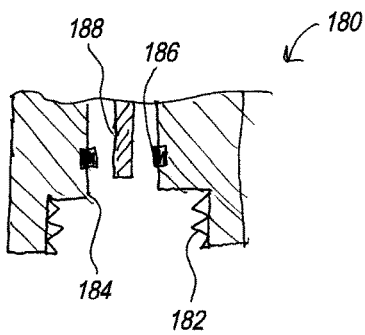
FIG. 21 illustrates a housing for receiving a gas canister.

FIG. 21 shows a corresponding housing 180 that can couple with and engage in fluid communication canister 151 shown in FIG. 20. Housing 180 includes a female threads 182 configured to receive threads 164 and a smooth channel 184 configured to engage smooth threads 172. Optionally a ring gasket 186 can be included within channel 184 to provide a high pressure seal. A pin 188 extends into channel 184 to provide a structure for rupturing rupturable membrane 162.

Figure 22:
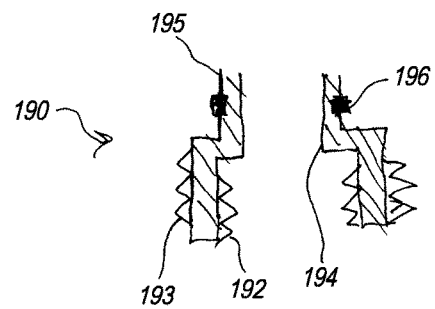
FIG. 22 illustrates an adapter for coupling a gas canister to the housing shown in FIG. 21.

In yet another embodiment, an adapter can be used to modify the thread patterns of a canister with a smooth neck portion to allow a filling systems to use canisters with different size threaded portions. FIG. 22 illustrates an adapter 190 that includes an inside thread pattern 192 configured to engage threads 164 of a canister with a smaller neck diameter than that of canister 151. Outer threads 193 can be configured to engage threads 182 of housing 180 illustrated in FIG. 21. Channel 194 has an inside diameter configured to receive the smooth neck portion of canister 151. Structure 195 surrounds channel 194 and is configured to be slideably received within channel 184. Pin 188 from housing 180 can extend down through channel 194 or alternatively a pin for rupturing a membrane can be attached within channel 194. An o-ring can optionally be included on adapter 190 to provide a seal between housing 180 and adapter 190. An o-ring (not shown) can also be include on the inside of channel 194 to provide a seal with the smooth portion of the neck of a canister.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cold weather apparel gas inflation system, comprising:
   an article of cold weather apparel selected from a jacket, a vest or a pant, the cold weather apparel including a gas inflatable insulation bladder positioned in the cold weather apparel, the gas inflatable insulation bladder including two layers of flexible material having a plurality of joined sections, and a plurality of non-joined sections, and an inflatable gas channel of interconnected gas cells provided by opposed joined sections and opposed non-joined sections of the two layers of flexible material;
   a hand-held, pressurizable gas supply container in fluid transfer communication with the gas channel in the article of cold weather apparel; and
   an adjustable gas flow control releasably coupled between, and in fluid transfer communication with, the gas inflatable insulation bladder and the hand-held, pressurized gas supply container, whereby the adjustable gas flow control is actuable to allow gas to flow out of the gas inflatable insulation bladder.

2. The cold weather apparel gas inflation system of claim 1 further comprising a user operable switch operably coupled to the adjustable gas flow control, the user operated switch being configured to provide selectable, incremental inflation or deflation of the inflatable bladder.

3. An inflation system as in claim 2, wherein the user operated switch is selected from the group consisting of a button switch, a slider, and a dial.

\* \* \* \* \*